(12) United States Patent
Chung et al.

(10) Patent No.: US 12,179,849 B2
(45) Date of Patent: Dec. 31, 2024

(54) REAR SPOILER SYSTEM FOR VEHICLE

(71) Applicants: HYUNDAI MOTOR COMPANY, Seoul (KR); KIA CORPORATION, Seoul (KR)

(72) Inventors: Minsik Chung, Seongnam-si (KR); Yongmin Park, Incheon (KR); Jimin Jeong, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 309 days.

(21) Appl. No.: 17/858,413

(22) Filed: Jul. 6, 2022

(65) Prior Publication Data
US 2023/0053837 A1   Feb. 23, 2023

(30) Foreign Application Priority Data
Aug. 17, 2021   (KR) .................. 10-2021-0107935

(51) Int. Cl.
B62D 35/00   (2006.01)
(52) U.S. Cl.
CPC ................... B62D 35/007 (2013.01)
(58) Field of Classification Search
CPC ........ B62D 35/007; B62D 37/02; Y02T 10/82
See application file for complete search history.

(56) References Cited

U.S. PATENT DOCUMENTS

| | | | |
|---|---|---|---|
| 6,193,302 B1 * | 2/2001 | Won | B62D 37/02 296/180.1 |
| 10,894,568 B2 * | 1/2021 | Bauer | B62D 37/02 |
| 2005/0194815 A1 * | 9/2005 | Mc Knight | B62D 35/007 296/180.5 |
| 2010/0090497 A1 * | 4/2010 | Beckon | B60Q 1/44 296/180.1 |
| 2018/0251166 A1 * | 9/2018 | Escoffier | B62D 35/007 |
| 2019/0366802 A1 * | 12/2019 | Kapoor | B60H 1/00764 |
| 2020/0377158 A1 * | 12/2020 | Cunningham | B62D 37/02 |
| 2020/0385070 A1 * | 12/2020 | Cattell | B62D 37/02 |
| 2022/0258813 A1 * | 8/2022 | Nakamura | B62D 37/02 |

FOREIGN PATENT DOCUMENTS

| | | | | |
|---|---|---|---|---|
| DE | 112004002393 T5 * | 9/2006 | .......... | B60K 11/085 |
| DE | 102015008474 A1 * | 1/2017 | .......... | B62D 35/007 |
| DE | 102016105994 A1 * | 10/2017 | | |
| DE | 102016105082 A1 * | 11/2017 | | |
| DE | 102017006839 A1 * | 1/2019 | | |
| DE | 102018213770 A1 * | 2/2020 | | |
| FR | 2890638 A3 * | 3/2007 | .......... | B62D 35/007 |
| FR | 3056185 A1 * | 3/2018 | .......... | B62D 35/007 |
| FR | 3069836 A1 * | 2/2019 | .......... | B62D 35/007 |
| FR | 3075153 B1 * | 11/2019 | .......... | B62D 35/007 |
| WO | WO-2021119805 A1 * | 6/2021 | ............ | B60R 1/062 |

* cited by examiner

*Primary Examiner* — Lori Lyjak
(74) *Attorney, Agent, or Firm* — MCDONNELL BOEHNEN HULBERT & BERGHOFF LLP

(57) ABSTRACT

A rear spoiler system includes a roof portion forming an upper frame of a vehicle body, a rear spoiler positioned at the rear of the vehicle body, connected to the roof portion and including an opening through which air passes, a variable shutter positioned at the rear spoiler to adjust the opening amount and opening position of the opening, and an actuator operating the variable shutter.

13 Claims, 14 Drawing Sheets

REAR SPOILER SYSTEM FOR VEHICLE

CROSS REFERENCE TO RELATED APPLICATIONS

This application claims priority to and the benefit of Korean Patent Application No. 10-2021-0107935 filed in the Korean Intellectual Property Office on Aug. 17, 2021, the entire contents of which are incorporated herein by reference.

BACKGROUND

(a) Field

The present disclosure relates to a rear spoiler system for a vehicle, and more particularly, to a rear spoiler system for a vehicle which may secure stability of the vehicle while being driven at a high speed by controlling flow of air based on a driving speed of the vehicle.

(b) Description of the Related Art

A rear spoiler of a vehicle may be a decorative device installed on the roof end or trunk of the vehicle in order to eliminate a vortex phenomenon of air which occurs at the rear of the vehicle, and may also be referred to as a tail spoiler or rear wing.

When the vehicle is driven, air in front of the vehicle may be pushed up, down, left and right, and here, the pushed air may be moved to the rear of the vehicle and return to its original position. However, it may take time for air to return to its original position, and the more time it takes, the more vacuum is formed at the rear of the vehicle. The vacuum formed here may pull the vehicle from the rear of the vehicle, the vehicle may thus be subjected to air resistance, and the vortex phenomenon may here occur.

When the vehicle is driven at a high speed, a lift phenomenon may occur in which a vehicle body is lifted due to the vortex phenomenon. In order to prevent this phenomenon, it is possible to secure stability of the vehicle when driven at a high speed by generating a down force that presses the rear of the vehicle toward the ground by the rear spoiler. However, the rear spoiler may have an opening under the rear spoiler to maximize a sense of openness, and in this case, the vehicle having the opening may have reduced stability while being driven at a high speed.

The above information disclosed in this Background section is only for enhancement of understanding of the background of the disclosure, and therefore it may contain information that does not form the prior art that is already known in this country to a person of ordinary skill in the art.

SUMMARY

An exemplary embodiment of the present disclosure provides a rear spoiler system which may secure a sense of openness of the vehicle by opening an opening of the rear spoiler when the vehicle is driven at a low speed, secure driving stability of the vehicle by closing the opening of the rear spoiler when the vehicle is driven at a high speed, and prevent contamination of a rear glass.

According to an exemplary embodiment of the present disclosure, a rear spoiler system for a vehicle includes a roof portion forming an upper frame of a vehicle body, a rear spoiler positioned at the rear of the vehicle body, connected to the roof portion and including an opening through which air passes, a variable shutter positioned at the rear spoiler to adjust the opening amount and opening position of the opening, and an actuator operating the variable shutter.

The rear spoiler system for a vehicle may further include a rear glass positioned under the opening, where the rear glass is cleaned by air passing through the opening.

The rear spoiler system for a vehicle may further include a vehicle operation detection unit measuring an operation state of a vehicle and outputting a corresponding signal, and a controller adjusting the opening amount and/or opening position of the variable shutter by controlling the operation of the actuator based on the output signal of the vehicle operation detection unit.

The actuator may include an operating motor driving the variable shutter, where the variable shutter is moved by rotation of the operating motor.

The rear spoiler may include a guide bar positioned on each of two sides of the variable shutter in a direction parallel to a movement direction of the variable shutter and guiding movement of the variable shutter.

The variable shutter may include a first shutter mounted on a rear spoiler front portion to be moved in a length direction of the vehicle body, and a second shutter mounted on a rear spoiler rear portion to be moved in the length direction of the vehicle body, and the operating motor may include a first motor driving the first shutter, and a second motor driving the second shutter.

The first and second shutters may respectively be moved along the guide bar, any one of a protrusion and a groove in contact with the protrusion and blocking the opening may be positioned at one end of the first shutter, and the other one of the protrusion and the groove may be positioned at one end of the second shutter.

The first and second motors may be driven independently from each other by the controller.

The vehicle operation detection unit may include a speed sensor, and when the detected speed of the vehicle is less than a set first speed, the controller may control operations of the first motor and the second motor to allow the variable shutter to be opened by a set first opening amount.

The first shutter may be positioned on the rear spoiler front portion.

When the speed of the vehicle is the set first speed or more and less than a second speed, the controller may control the operations of the first motor and the second motor to allow the variable shutter to be opened by a set second opening amount.

The opening position of the variable shutter may be adjacent to a rear spoiler central portion.

When the speed of the vehicle is the set second speed or more, the controller may control the operations of the first motor and the second motor to allow the variable shutter to maintain a closed state.

As set forth above, the rear spoiler system according to an exemplary embodiment of the present disclosure may control the flow of air by adjusting the opening amount and opening position of the opening positioned in the rear spoiler based on the driving speed of the vehicle.

In addition, the rear spoiler system according to an exemplary embodiment of the present disclosure may secure the driving stability of the vehicle by fully closing the opening of the rear spoiler to prevent the vehicle driven at the high speed from having the increased lift.

In addition, the present disclosure may secure the sense of openness of the vehicle by partially opening the opening of the rear spoiler within a set driving speed of the vehicle, and efficiently remove dust and contaminants attached to the rear glass by air flowing into the opening of the opened rear spoiler.

In addition, an effect which may be obtained or predicted by an exemplary embodiment of the present disclosure is disclosed directly or implicitly in the detailed description of an exemplary embodiment of the present disclosure.

That is, various effects predicted by an exemplary embodiment of the present disclosure are disclosed in the detailed description described below.

DETAILED DESCRIPTION

Figure 1:
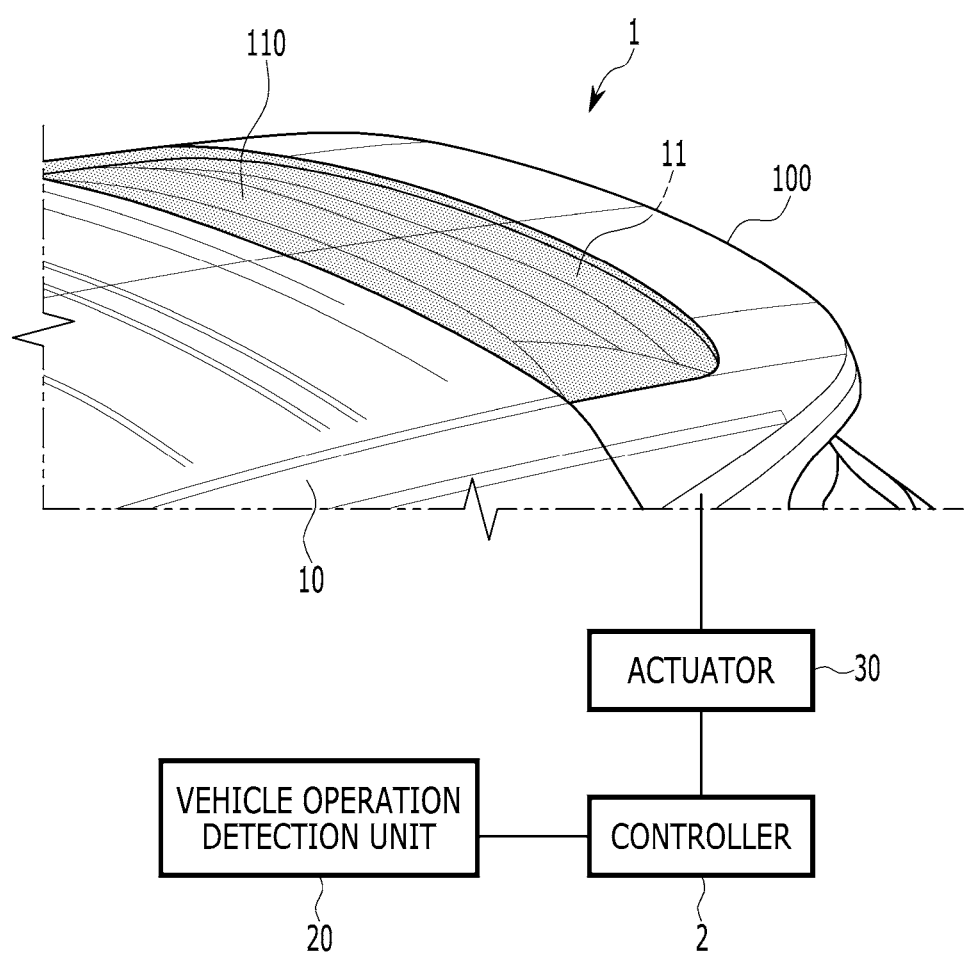
FIG. 1 is a view showing a roof portion of a vehicle body, including a rear spoiler of a rear spoiler system according to an exemplary embodiment of the present disclosure.

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

A portion unrelated to the description is omitted in order to describe the present disclosure, and the same or similar components are denoted by the same reference numeral throughout the present specification.

The size and thickness of each component shown in the accompanying drawings are arbitrarily shown for convenience of explanation, and therefore, the present disclosure is not necessarily limited to contents shown in the accompanying drawings, and the thicknesses are exaggerated in the drawings in order to clearly represent several portions and regions.

In the following description, dividing names of components into first, second, and the like is to divide the names because the names of the components are the same as each other, and an order thereof is not particularly limited.

Hereinafter, the description describes the present disclosure in detail based on the detailed description made with reference to the drawings as follows.

Figure 2:
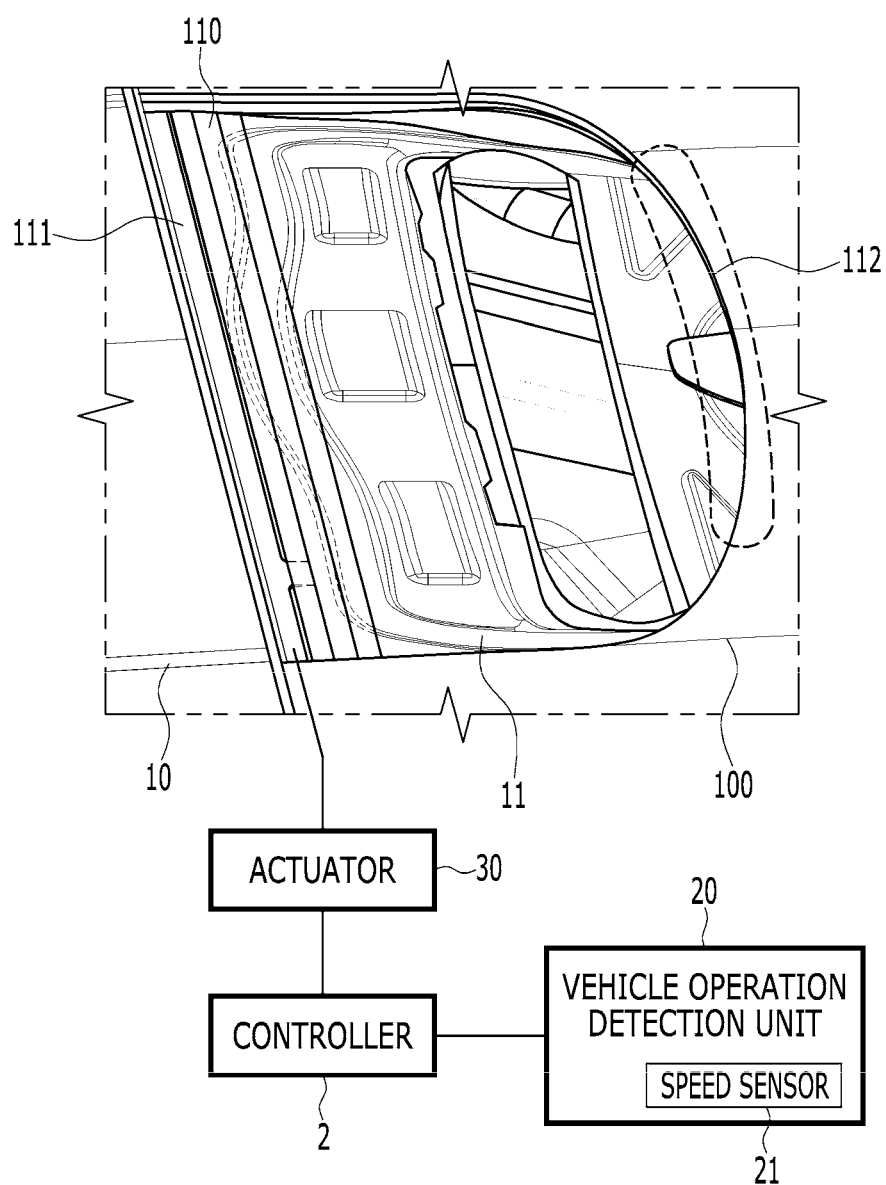
FIG. 2 is a view showing the rear spoiler system according to an exemplary embodiment of the present disclosure.

FIG. 1 is a view showing a roof portion of a vehicle body, including a rear spoiler of a rear spoiler system according to an exemplary embodiment of the present disclosure; and FIG. 2 is a view showing the rear spoiler system according to an exemplary embodiment of the present disclosure.

Referring to FIGS. 1 to 2, a rear spoiler 100 may be positioned at the rear of a vehicle body 1 and connected to a roof portion 10 forming an upper frame of the vehicle body 1.

The rear spoiler 100 may include a rear spoiler front portion 111 corresponding to one end in contact with the roof portion 10 with respect to the front of the vehicle body 1, and a rear spoiler rear portion 112 extended to the rear of the vehicle body 1 therefrom to be the other end.

For example, a rear glass 11 of the vehicle may be positioned under the rear spoiler 100.

A vehicle driver may watch the rear of the vehicle through the rear glass 11.

The rear spoiler 100 may include a variable shutter 110 which may adjust an amount of flowing air.

For example, the variable shutter 110 may be made of an elastic material which may be curved or bent, and may be a plurality of panels connected with each other to function as a plurality of nodes or joints, and may be freely curved or bent.

The variable shutter 110 may include an opening 101 (see FIG. 4) to allow air to pass therethrough.

The rear spoiler system may include an actuator 30 operating the variable shutter 110.

In addition, the rear spoiler system according to an exemplary embodiment of the present disclosure may further include a controller 2 and a vehicle operation detection unit 20.

The vehicle operation detection unit 20 may be electrically interconnected with the controller 2, the controller may be electrically interconnected with the actuator 30, and the actuator 30 may be electrically interconnected with the rear spoiler 100, thereby implementing the rear spoiler system.

First, the vehicle operation detection unit 20 positioned in the vehicle may measure a state value based on driving of the vehicle and output a signal for the state value.

For example, the state value may include a speed of the vehicle.

Accordingly, the vehicle operation detecting unit 20 may include a speed sensor 21 which may detect the speed of the vehicle.

When the driving speed measured by the speed sensor 21 is transmitted to the controller as an output signal, the controller 2 may transmit a driving command to the actuator 30 based on the output signal and control driving of the actuator 30, the variable shutter 110 may be operated by the actuator 30, and the position and size of the opening 101 (see FIG. 5) of the rear spoiler 100 may thus be determined.

In the description of the present disclosure, the position may be defined as an opening position, and the size may be defined as an opening amount.

These terms are described in detail below.

Figure 3:
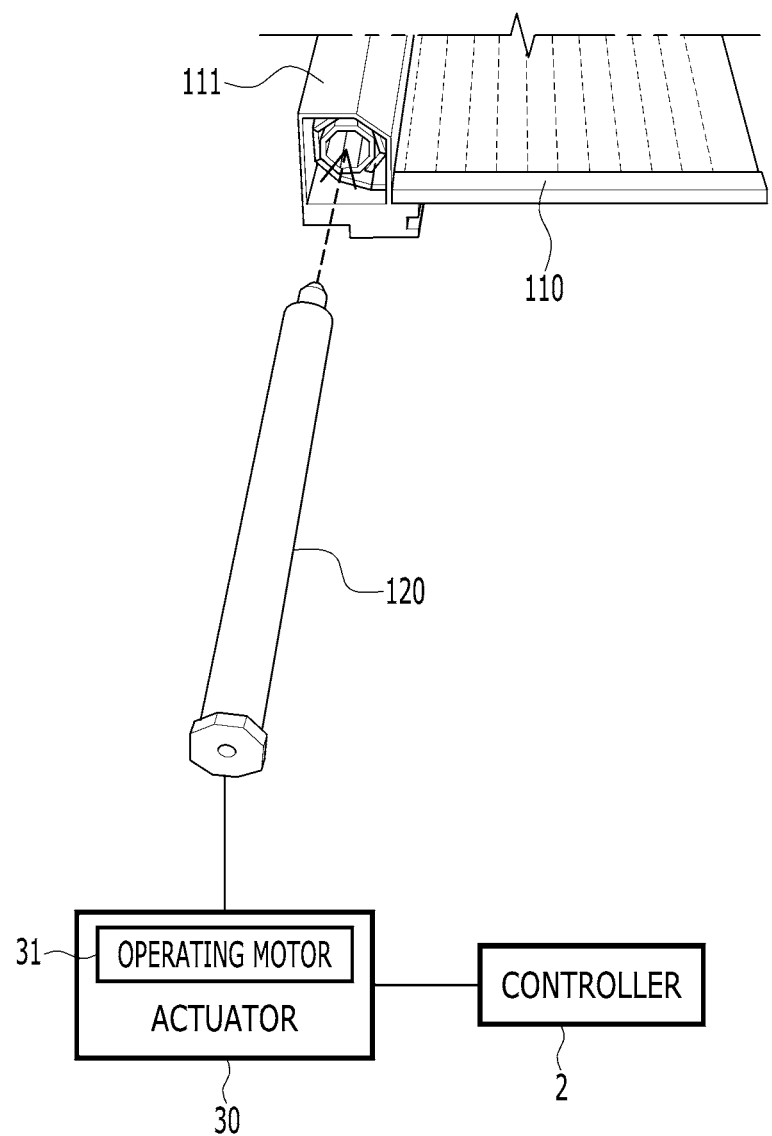
FIG. 3 is a view showing a configuration of the rear spoiler system according to an exemplary embodiment of the present disclosure.

FIG. 3 is a view showing a configuration of the rear spoiler system according to an exemplary embodiment of the present disclosure.

Referring to FIGS. 1 to 3, the actuator 30 may include an operating motor 31 driving the variable shutter 110.

The variable shutter 110 connected to the operating motor 31 may be moved by driving the operating motor 31.

The operating motor 31 is not limited to a particular type of motor.

For example, it may be assumed that the opening position and opening amount for each vehicle speed are mapped in a memory of the rear spoiler system, and the speed measured by the speed sensor 21 is transmitted to the controller 2. In this case, the controller 2 may transmit information on the mapped opening position and opening amount to the operating motor 31 included in the actuator 30, the operating motor 31 may move the variable shutter 110, and the opening position and the opening amount may thus be controlled.

In particular, referring to FIG. 3, the operating motor 31 may be connected to a drive shaft 120 connected to the variable shutter 110.

The drive shaft 120 may be rotated by the operating motor 31 to move the variable shutter 110.

For example, the rear spoiler front portion 111, one of the components of the rear spoiler 100, may be a housing having an empty interior.

In this case, the drive shaft 120 may be inserted into the rear spoiler front portion 111.

In addition, the variable shutter 110 may be inserted into the rear spoiler front portion 111 together with the drive shaft 120.

For example, the operating motor 31 may control the number of rotations of the drive shaft.

The controller 2 may transmit the information on the mapped opening position and opening amount corresponding to the speed of the vehicle measured by the speed sensor 21 to the operating motor 31, and the drive shaft 120 may be rotated by a set number of rotations by the operating motor 31 and control movement of the variable shutter 110 connected to the drive shaft 120.

In more detail, when the drive shaft 120 is rotated clockwise or counterclockwise, the variable shutter 110 may be wound around an outer periphery of the drive shaft 120 and drawn into the rear spoiler front portion 111.

When the variable shutter 110 is released from the outer periphery of the drive shaft 120, the variable shutter 110 may be pushed to the outside of the rear spoiler front portion 111.

In this manner, the variable shutter 110 may be inserted into or protruded to the outside of the rear spoiler front portion 111 by driving the operating motor 31, and front and rear movement of the vehicle may thus be controlled.

Figure 4:
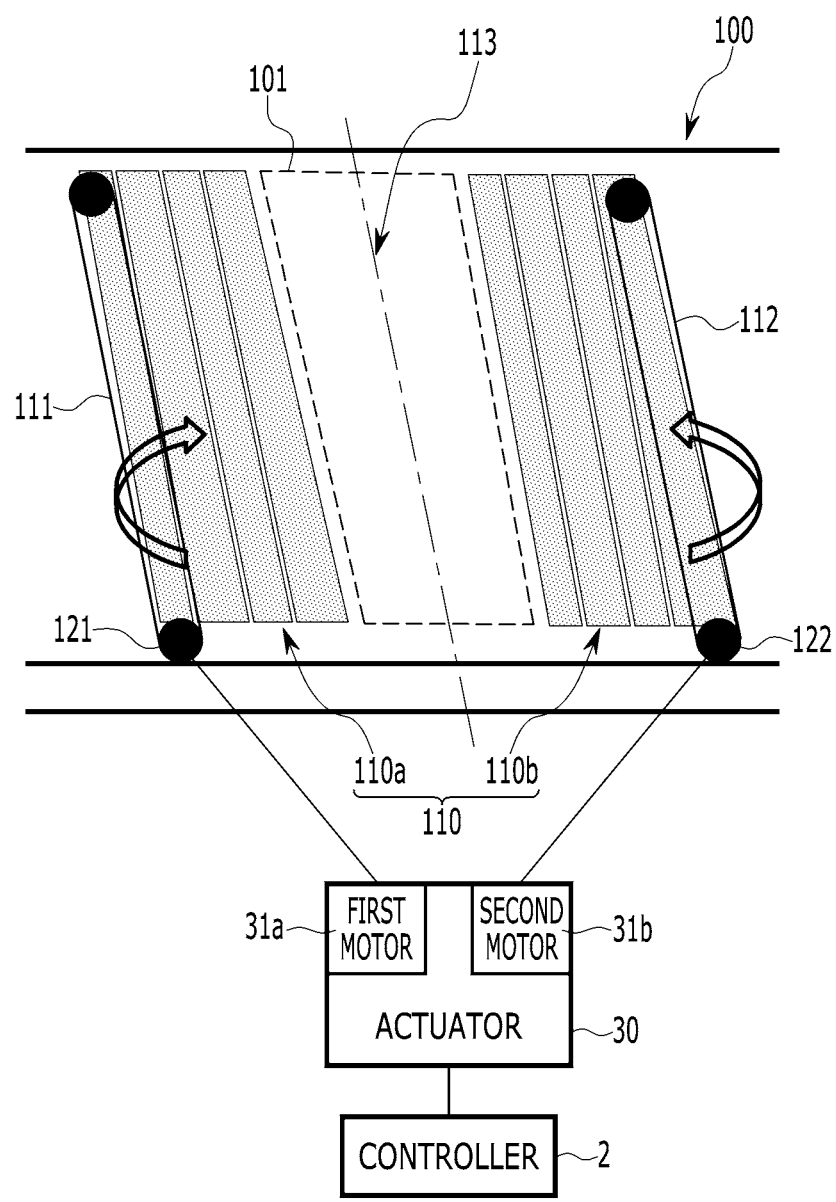
FIG. 4 is a view showing a movement of a variable shutter based on driving of an operating motor according to another exemplary embodiment of the present disclosure.
Figure 5:
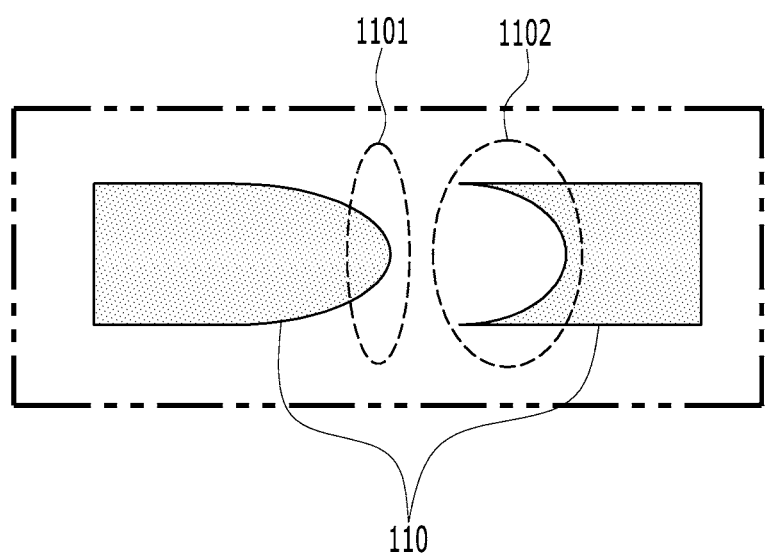
FIG. 5 is a view showing a coupling principle of the variable shutter according to another exemplary embodiment of the present disclosure.

FIG. 4 is a view showing a movement of a variable shutter based on driving of an operating motor according to another exemplary embodiment of the present disclosure; and FIG. 5 is a view showing a coupling principle of the variable shutter according to another exemplary embodiment of the present disclosure.

Referring to FIG. 4, the rear spoiler 100 may include the opening 101 through which a flow of air blown in a direction opposite to a driving direction of the vehicle passes when the vehicle is driven.

The opening 101 may be positioned between the rear spoiler front portion 111 and the rear spoiler rear portion 112, and the opening 101 is not limited to its shape shown in the drawings.

The opening amount and opening position of the opening 101 positioned in the rear spoiler 100 may be adjusted by the movement of the variable shutter 110.

Magnitudes of drag and lift occurring based on the driving of the vehicle may depend on the size and position of the opening 101.

In addition, efficiency of removing contaminants attached to the rear glass 11 positioned under the opening 101 may be different.

For example, when the speed of the vehicle is less than 60 km/h, the operating motor 31 may rotate the drive shaft 120 positioned inside the rear spoiler 100, and the variable shutter 110 connected to the drive shaft 120 may be wound around the outer periphery of the drive shaft 120 to be drawn into the rear spoiler 100.

On the other hand, when the speed of the vehicle is 60 km/h or more, the drive shaft 120 may be rotated by the operating motor 31 and the variable shutter 110 may be pushed from the inside of the rear spoiler 100 to the outside.

In particular, the control of the variable shutter 110 may be effective in a specific speed section when the vehicle is driven.

The effect in the specific speed section is described in detail below.

The variable shutter 110 according to another exemplary embodiment of the present disclosure may include a first shutter 110a mounted on the rear spoiler front portion 111 to be moved in a length direction of the vehicle body and a second shutter 110b mounted on the rear spoiler rear portion 112 to be moved in the length direction of the vehicle body. The operating motor 31 may include a first motor 31a driving the first shutter 110a and a second motor 31b driving the second shutter 110b.

The first motor 31a and the second motor 31b may respectively be connected to a first drive shaft 121 and a second drive shaft 122 respectively drawn into the rear spoiler front portion 111 and the rear spoiler rear portion 112.

The interior of the rear spoiler rear portion 112 may also function as the housing.

The first and second drive shafts 121 and 122 driven by the first and second motors 31a and 31b may respectively draw the first shutter 110a and the second shutter 110b into the rear spoiler 100 or push the same out.

In more detail, a driving signal may be transmitted to the actuator 30 by the controller 2, and the first and second motors 121 and 122 may thus be driven.

For example, the first and second motors 31a and 31b may be controlled simultaneously by the controller 2, and for another example, the first and second motors 31a and 31b may be controlled independently from each other.

The first drive shaft 121 and the second drive shaft 122 may be controlled independently by the driving of the first and second motors 31a and 31b. Accordingly, the opening position and opening amount of the opening 101 may be adjusted by moving the first and second shutters 110a and 110b simultaneously or moving the first and second shutters 110a and 110b independently from each other.

The first and second shutters 110a and 110b may be moved to face each other or may be moved to be away from each other.

When the first shutter 110a and the second shutter 110b are moved to face each other and come into contact with each other, the opening amount of the opening 101 positioned in the rear spoiler 100 becomes 'zero (0)'.

That is, the opening 101 may be closed.

Referring to FIG. 5, any one of a protrusion 1101 and a groove 1102 in contact with the protrusion 1101 and blocking the opening 101 may be positioned at one end of the first shutter 110a, and the other one of the protrusion 1101 and the groove 1102 may be positioned at one end of the second shutter 110b.

The protrusion 1101 and the groove 1102 may be coupled to each other to close the opening 101.

For example, the protrusion 1101 and the groove 1102 may couple the first shutter 110a and the second shutter 110b to each other through a tooth engagement, and close the opening 101.

Figure 6:
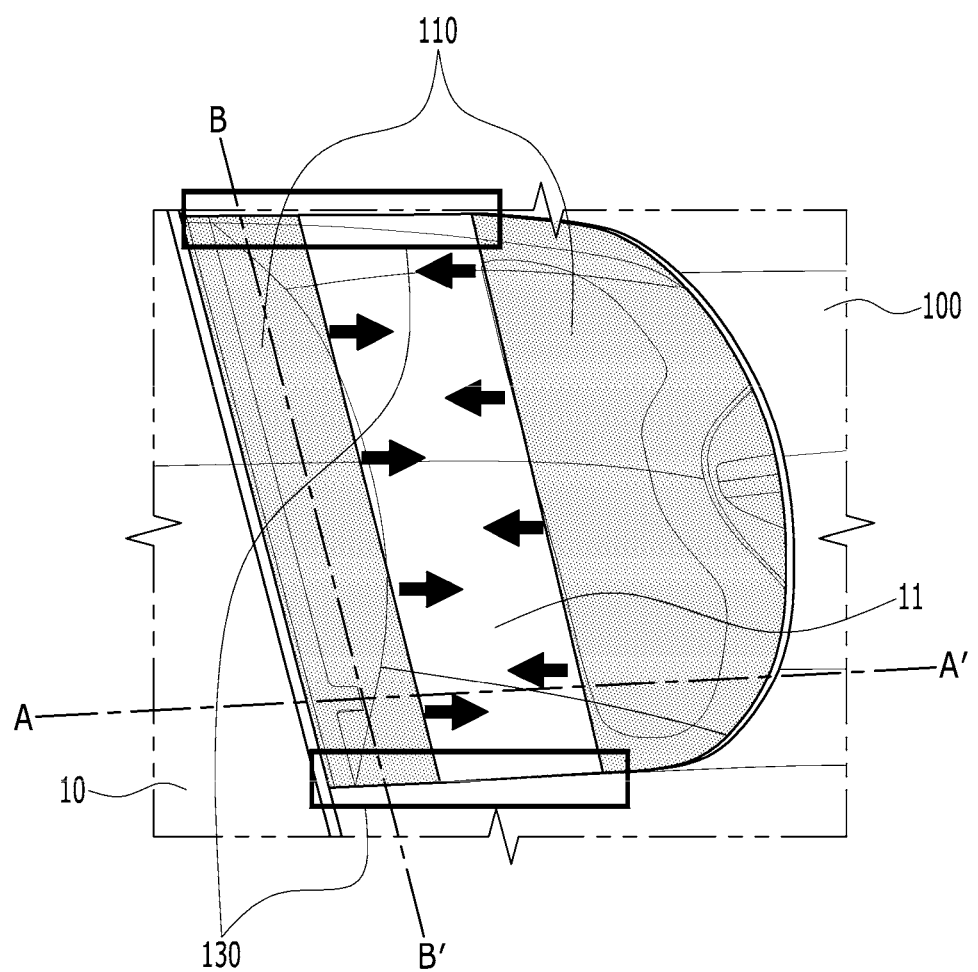
FIG. 6 is a view showing a rear spoiler system including a guide bar according to another exemplary embodiment of the present disclosure.
Figure 7:
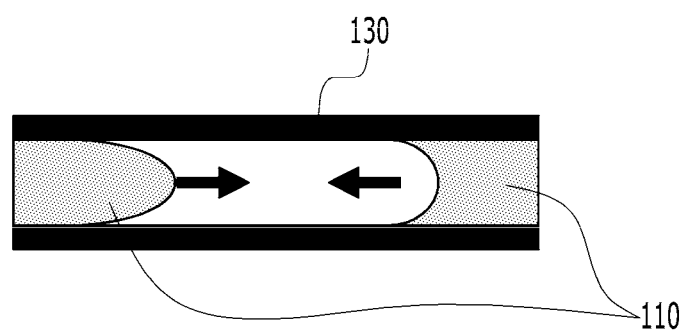
FIG. 7 is a view showing the inside of the guide bar taken along section A-A' of FIG. 6.

FIG. 6 is a view showing a rear spoiler system including a guide bar according to another exemplary embodiment of the present disclosure; FIG. 7 is a view showing the inside of the guide bar taken along section A-A' of FIG. 6; and FIG. 8 is a view showing the inside of the guide bar taken along section B-B' of FIG. 6.

Figure 8:
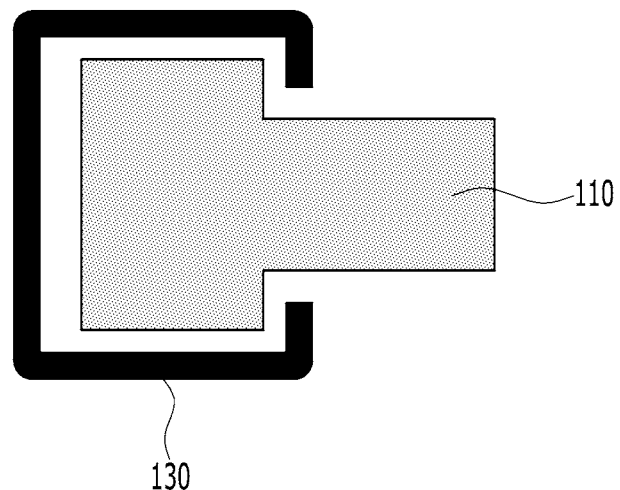
FIG. 8 is a view showing the inside of the guide bar taken along section B-B' of FIG. 6.

Referring to FIGS. 6 to 8, the rear spoiler 100 may further include a guide bar 130 positioned on each of two sides of the variable shutter 110 in a direction parallel to a movement direction of the variable shutter 110 and guiding the movement of the variable shutter 110.

The guide bar 130 may enable the smooth movement of the variable shutter 110 and prevent the separation of the variable shutter 110 from the rear spoiler 100.

A portion of the variable shutter 110 may be inserted into the guide bar 130 to be moved to the front and/or rear of the vehicle along the guide bar 130.

For example, the first and second shutters 110a and 110b may be respectively moved along the guide bar 130.

Accordingly, the first and second shutters 110a and 110b pushed out by the driving of the first and second motors 121 and 122 may be stably moved to the front and/or rear of the vehicle along the guide bar 130 positioned on each of two sides of the rear spoiler 100.

On the other hand, even when drawn into the rear spoiler 100 by the rotation of the first and second motors 121 and 122, the first and second shutters 110a and 110b may be stably moved along the guide bar 103.

Referring to FIG. 7, the variable shutters 110 may be coupled to each other in the guide bar 130.

For example, partial ends of the first and second shutters 110a and 110b may be in contact with each other in the guide bar 130, and coupled to each other.

Accordingly, the first shutter 110a and the second shutter 110b may be coupled and fixed to each other.

That is, the first shutter 100a and the second shutter 100b may be coupled to each other only by coupling the partial ends of the first and second shutters 110a and 110b positioned in the guide bar 130 to each other.

Referring to FIG. 8, step differences with the other portion of the variable shutter 100 positioned outside the guide bar 130 may be formed at a portion of the variable shutter 110 positioned in the guide bar 130 in both directions, up and down, based on a height direction of the vehicle body 1.

The guide bar 130 may surround a portion including the step differences, and it is thus possible to prevent the separation of the variable shutter 100 from the guide bar 130 in a B-B' direction.

Hereinafter, the description describes the opening amount and opening position of the opening 101 based on the driving speed of the vehicle in detail through the description below with reference to FIGS. 9 to 14.

Referring to FIGS. 9 to 14, a position where the opening 101 is positioned in the rear spoiler 100 may depend on the speed of the vehicle.

In the description of the present disclosure, an experimental value is derived while a vehicle having a weight of 1500 kg is driven in a speed range of zero (0) km/h or more and 200 km/h or less for example.

The drag occurring in the vehicle while a vehicle is driven may be proportional to a drag coefficient $C_d$. In an exemplary embodiment of the present disclosure, the other external factors affecting the drag other than a factor affecting the drag coefficient $C_d$ are all set to the same value.

Therefore, change in the drag may be checked by using a magnitude of the drag coefficient $C_d$.

The drag coefficients $C_d$ when the opening 101 is fully opened (i.e. opening amount of 100%) and fully closed (i.e. opening amount of zero (0)%) may each be set as a reference value.

The opening amount when the opening 101 is fully opened may be defined as a reference opening amount.

A difference between the reference value and a drag coefficient value of the current driving state may be defined as a drag coefficient change rate $\Delta C$.

A formula for calculating the drag coefficient change rate $\Delta C$ may be defined as "reference value—drag coefficient value of the current driving state."

The larger the drag coefficient change rate $\Delta C$, the greater the difference between an existing drag and the drag in the current state. When the drag coefficient change rate is positive, the drag is decreased, and when the drag coefficient change rate is negative, the drag is increased.

Accordingly, it may be seen whether occurrence of drag is reduced based on the opening amount and the opening position of the opening 101 of the rear spoiler 100.

In addition, as described above, the speed serving as a reference to control the opening position and opening amount of the opening 101 may be mapped to the controller 2 in advance in order to measure the drag coefficient $C_d$.

Hereinafter, the speed set in advance may be defined as a first speed and a second speed.

Similarly, a size of the opening 101 opened when the speed of the vehicle is less than the first speed may be defined as a first opening amount, and a size of the opening 101 opened when the speed of the vehicle is the first speed or more and less than the second speed may be defined as a second opening amount.

Figure 9:
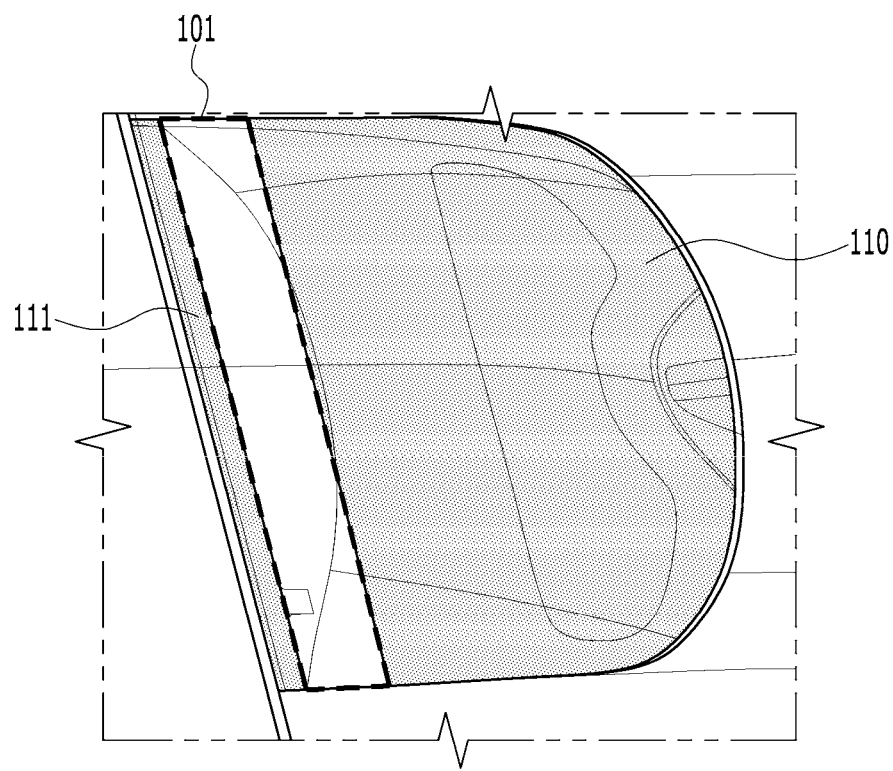
FIG. 9 is a view showing an opening position of an opening in a rear glass pollution prevention mode according to an exemplary embodiment of the present disclosure.
Figure 10:
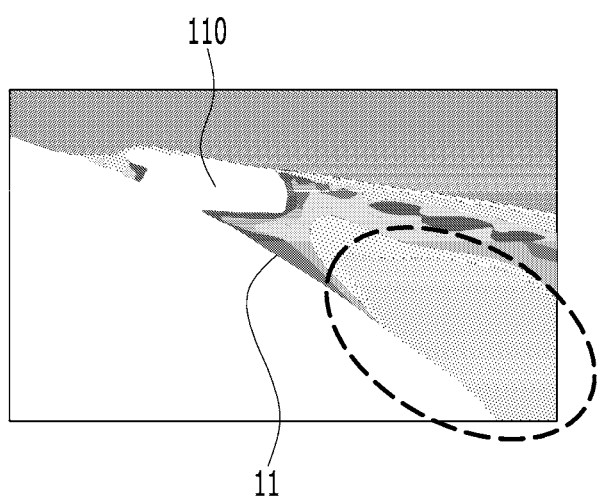
FIG. 10 is a view showing a cleaning degree of the rear glass in the rear glass pollution prevention mode according to an exemplary embodiment of the present disclosure.

FIG. 9 is a view showing an opening position of the opening in a rear glass pollution prevention mode according to an exemplary embodiment of the present disclosure; and FIG. 10 is a view showing a cleaning degree of the rear glass in the rear glass pollution prevention mode according to an exemplary embodiment of the present disclosure.

The speed sensor 21 included in the vehicle operation detection unit 20 may detect the driving speed of the vehicle.

When the detected driving speed of the vehicle is less than the set first speed, the controller 2 may control the operation of the operating motor 31, specifically, the operations of the first motor 31a and the second motor 31b to allow the variable shutter 110 to be opened by the set first opening amount.

For example, the set first speed may correspond to 100 km/h, and for convenience, a driving state of the vehicle in a section of this driving speed may be referred to as a "rear glass pollution prevention mode."

The rear spoiler 100 may surely have a basic function to reduce the occurrence of the drag. However, a main function of the rear spoiler 100 in the "rear glass pollution prevention mode" corresponding to a relatively low-speed driving mode may be to clean the rear glass 11.

Accordingly, the first opening amount set to maximize a cleaning effect may correspond to ⅓ of the reference opening amount or an approximate value thereof.

For another example, in the "rear glass pollution prevention mode," the first shutter 110a may be positioned on the rear spoiler front portion 111.

The opening position of the opening 101 may be positioned near the rear spoiler front portion 111.

That is, the size of the opening 101 positioned from the rear spoiler front portion 111 to the position of the second shutter 110b may correspond to ⅓ of the reference opening amount or the approximate value thereof.

Referring to FIG. 10, when the opening 101 is positioned at the above position, a cleaning amount of the rear glass 11 may be maximized by the flow of air moved through the opening 101.

A portion indicated by a dotted circle in FIG. 10 may indicate an area in which the rear glass 11 is cleaned.

It may be seen that most of the area of the rear glass 11 positioned under the variable shutter 110 is cleaned.

Therefore, even when the rear glass 11 includes no separate wiper, it is possible to maintain a clean state of the rear glass 11.

The opening amount and opening position of the variable shutter 110 may be surely adjusted based on the contamination position of the rear glass 11.

Figure 11:
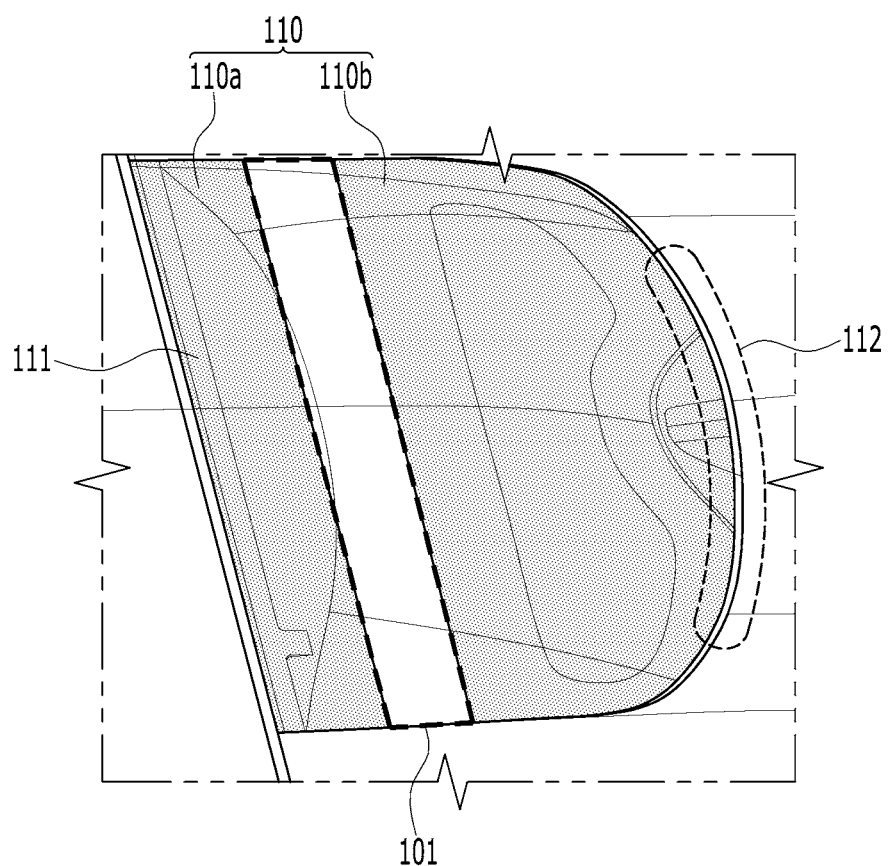
FIG. 11 is a view showing an opening position of the opening in a fuel economy mode according to an exemplary embodiment of the present disclosure.
Figure 12:
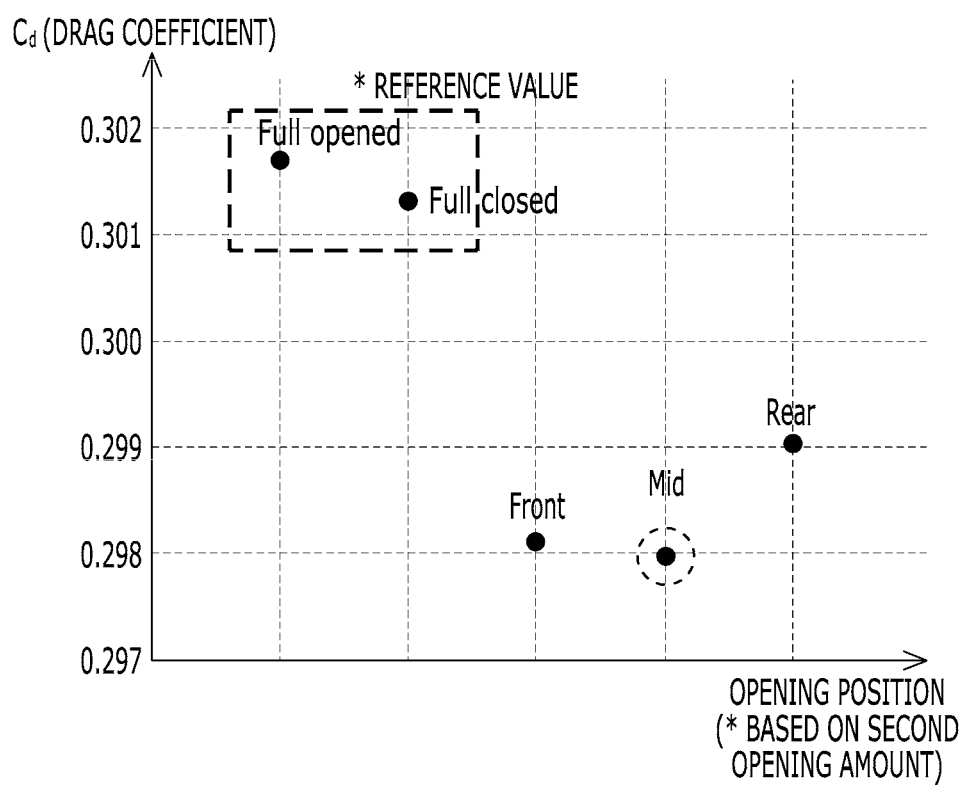
FIG. 12 is a view showing a drag coefficient depending on the opening position of the opening according to an exemplary embodiment of the present disclosure.

FIG. 11 is a view showing an opening position of the opening in a fuel economy mode according to an exemplary embodiment of the present disclosure; and FIG. 12 is a view showing a drag coefficient depending on the opening position of the opening according to an exemplary embodiment of the present disclosure.

When the speed of the vehicle is the set first speed or more and less than the preset second speed, the controller 2 may control the operations of the first motor 31a and the second motor 31b to allow the variable shutter 110 to be opened by the set second opening amount.

For example, the set first speed may correspond to 100 km/h, and the set second speed may correspond to 160 km/h.

For convenience, a driving state of the vehicle in a section of this driving speed may be referred to as a "fuel economy mode."

In a case of the "fuel economy mode," a main function of the rear spoiler 100 may be to reduce the drag.

Therefore, the second opening amount set to maximize this effect by the experimental value may correspond to ⅓ of the reference opening amount or an approximate value thereof.

Similarly, when the opening position of the variable shutter 110 is set to maximize reduction of the drag, the opening position of the variable shutter 110, that is, the opening positions of the first shutter 110a and the second shutter 110b, in the "fuel economy mode," may be adjacent to a rear spoiler central portion 113.

Referring to FIG. 12, a reduction rate of the drag coefficient $C_d$ may be the highest when the opening position of the opening 101 is positioned adjacent to the rear spoiler central portion 113 (i.e. middle portion) rather than positioned adjacent to the rear spoiler front portion 111 (i.e. front portion) or the rear spoiler rear portion 112 (i.e. rear portion).

That is, the size of the opening 101 positioned from the rear spoiler central portion 113 to the positions of first shutter 110a and the second shutter 110b may correspond to ⅓ of the reference opening amount or the approximate value thereof.

In the "fuel economy mode" corresponding to a relatively high-speed driving state, an improvement measure may be further needed to respond to an air resistance that occurs greater than in the "rear glass pollution prevention mode" corresponding to a relatively low-speed driving state. When the opening position of the opening 101 has the second opening amount and is positioned adjacent to the rear spoiler central portion 113, a measured drag coefficient $C_d$ may be 0.298, and the drag coefficient change rate $\Delta C$ may have a value between about 0.003 and 0.004 when compared with the reference values (0.302 and 0.301) of the opening in the fully opened state and fully closed state.

That is, it may be seen that the changed drag is reduced when compared to the reference drag.

As the speed of the vehicle is increased, the air resistance may be increased. As a result, it may be seen that an absolute value of the resistance applied to the vehicle is greatly reduced, and fuel efficiency of the vehicle may thus be improved.

Figure 13:
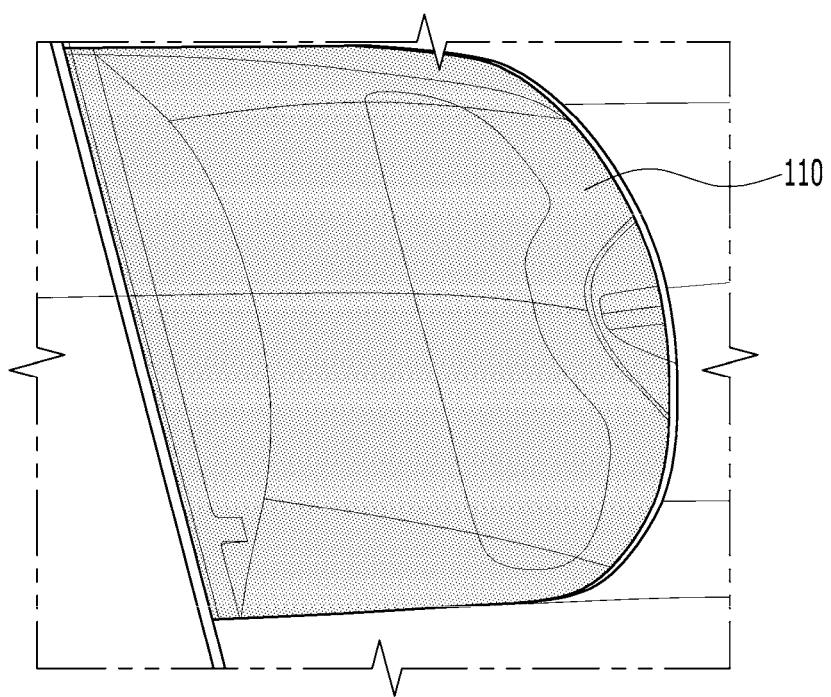
FIG. 13 is a view showing a state of the variable shutter in a high-speed stability securing mode according to an exemplary embodiment of the present disclosure.
Figure 14:
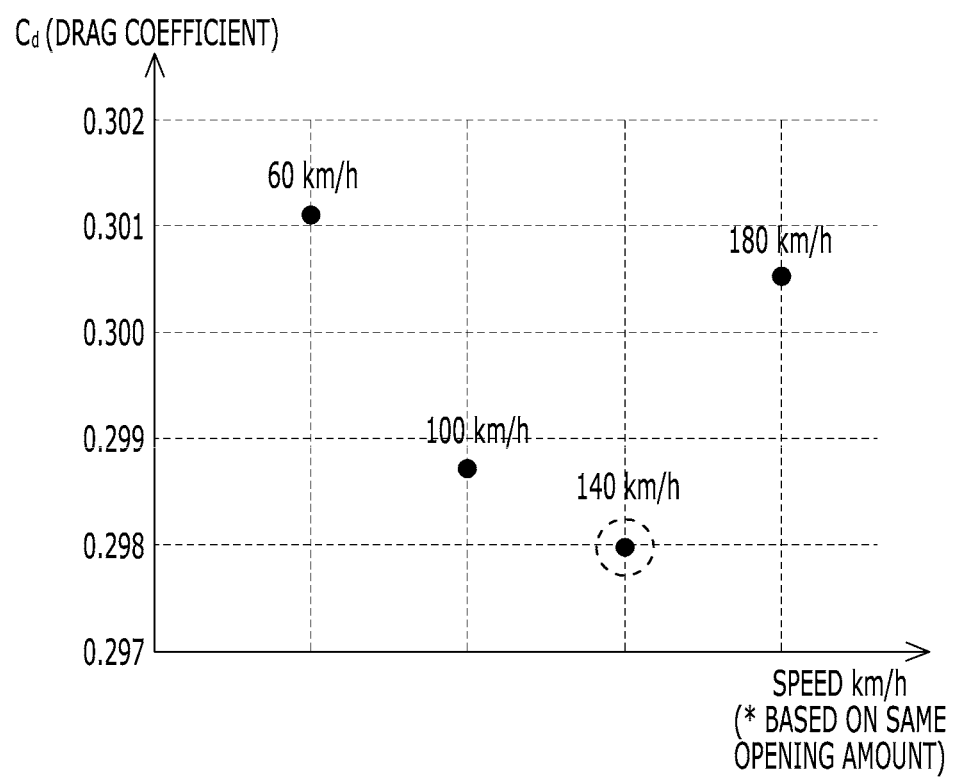
FIG. 14 is a view showing the drag coefficient depending on a vehicle speed according to an exemplary embodiment of the present disclosure.

FIG. 13 is a view showing a state of the variable shutter in a high-speed stability securing mode according to an exemplary embodiment of the present disclosure; and FIG. 14 is a view showing the drag coefficient depending on the vehicle speed according to an exemplary embodiment of the present disclosure.

When the speed of the vehicle is the preset second speed or more, the controller 2 may control the operations of the first motor 121 and the second motor 122 to allow the variable shutter 110 to maintain the closed state.

For example, the preset second speed may correspond to 160 km/h, and for convenience, a driving state of the vehicle in a section of this driving speed may be referred to as a "high-speed stability securing mode."

Here, the variable shutter 110 may fully close the opening 101, and therefore, air flowing while the vehicle is driven may not pass through the rear spoiler 100.

Hereinafter, a reason for maintaining the closed state is described in detail.

Referring to FIG. 14, when the opening 101 is opened in the "high-speed stability securing mode" corresponding to a driving speed of 180 km/h for example, it may be seen that reduction of the drag coefficient $C_d$ is not larger than the reference value when compared to the fuel economy mode (100 km/h or 140 km/h) based on the same opening amount.

That is, when the vehicle is driven at a super-high speed as described above, improvement of the drag may not be relatively large even though the opening 101 is opened.

In addition, when the opening 101 is opened in the "high-speed stability securing mode," relatively much stronger lift may occur compared to the lifts occurring in the plurality of driving modes described above due to the flow of air passing through the opening 101 and the vortex phenomenon. The greater the lift, the higher the vehicle body 1 is lifted, and adhesion between the vehicle body 1 and the ground may be reduced, thus reducing the driving stability of the vehicle in the super-high-speed driving mode.

Therefore, in the "high-speed stability securing mode," the opening 101 may be fully closed to promote the driving stability of the vehicle.

The present disclosure completely control the flow of air by adjusting the opening amount and opening position of the opening 101 positioned in the rear spoiler 100 based on the driving speed of the vehicle.

It is thus possible to control the air resistance and increase the fuel efficiency of the vehicle, while controlling the lift occurring due to the flow of air to secure the driving stability of the vehicle.

In addition, the present disclosure may secure the sense of openness of the vehicle by partially opening the opening 101 of the rear spoiler 100 within the set driving speed of the vehicle, and efficiently remove dust and contaminants attached to the rear glass 11 by air flowing into the opening 101 of the opened rear spoiler 100.

Therefore, there is no need to install the separate wiper on the rear glass 11, thereby additionally reducing the cost.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

The invention claimed is:

1. A rear spoiler system for a vehicle comprising:
a roof portion forming an upper frame of a vehicle body;
a rear spoiler positioned at a rear of the vehicle body, connected to the roof portion and including an opening through which air passes;
a variable shutter positioned at the rear spoiler and configured to adjust an opening amount and an opening position of the opening; and
an actuator configured to operate the variable shutter;
wherein the variable shutter includes:
a first shutter mounted on a front portion of the rear spoiler configured to be moved in a length direction of the vehicle body; and
a second shutter mounted on a rear portion of the rear spoiler configured to be moved in the length direction of the vehicle body.

2. The rear spoiler system of claim 1, further comprising a rear glass positioned under the opening, wherein the rear glass is cleaned by air passing through the opening.

3. The rear spoiler system of claim 1, further comprising:
a vehicle operation detection unit configured to measure an operation state of the vehicle and outputting a corresponding signal; and
a controller configured to adjust the opening amount or the opening position of the opening by controlling the actuator based on the output signal of the vehicle operation detection unit.

4. The rear spoiler system of claim 3, wherein the actuator includes an operating motor driving the variable shutter, wherein the variable shutter is moved by rotation of the operating motor.

5. The rear spoiler system of claim 4, wherein the rear spoiler includes a guide bar positioned on each side of the variable shutter in a direction parallel to a movement direction of the variable shutter, and the guide bar being configured to guide movement of the variable shutter.

6. The rear spoiler system of claim 5, wherein the operating motor includes:
a first motor driving the first shutter; and
a second motor driving the second shutter.

7. The rear spoiler system of claim 6, wherein the first shutter and the second shutter are each moved along the guide bar, wherein one of a protrusion and a groove in contact with the protrusion and blocking the opening is positioned at one end of the first shutter, and wherein an other one of the protrusion and the groove is positioned at one end of the second shutter.

8. The rear spoiler system of claim 6, wherein the first motor and the second motor are each driven independently from each other by the controller.

9. A rear spoiler system for a vehicle comprising:
a roof portion forming an upper frame of a vehicle body;
a rear spoiler positioned at a rear of the vehicle body, connected to the roof portion and including an opening through which air passes;
a variable shutter positioned at the rear spoiler and configured to adjust an opening amount and an opening position of the opening;
an actuator configured to operate the variable shutter;
a vehicle operation detection unit configured to measure an operation state of the vehicle and outputting a corresponding signal; and
a controller configured to adjust the opening amount or the opening position of the opening by controlling the actuator based on the output signal of the vehicle operation detection unit;
wherein the vehicle operation detection unit includes a speed sensor, and when a detected speed of the vehicle is less than a set first speed, the controller controls operations of a first motor and a second motor to allow the variable shutter to be opened by a set first opening amount.

10. The rear spoiler system of claim 9, wherein the first shutter is positioned on the front portion of rear spoiler.

11. The rear spoiler system of claim 9, wherein when the detected speed of the vehicle is the set first speed or more, but less than a second speed, the controller controls the operations of the first motor and the second motor to allow the variable shutter to be opened by a set second opening amount.

12. The rear spoiler system of claim 11, wherein the opening position of the variable shutter is adjacent to a central portion of the rear spoiler.

13. The rear spoiler system of claim 9, wherein when the detected speed of the vehicle is a set second speed or more, the controller controls the operations of the first motor and the second motor to allow the variable shutter to maintain a closed state.

* * * * *